US009503704B2

(12) United States Patent
Ando

(10) Patent No.: US 9,503,704 B2
(45) Date of Patent: Nov. 22, 2016

(54) APPARATUS AND METHOD FOR PICKING UP ARTICLE DISPOSED IN THREE-DIMENSIONAL SPACE USING ROBOT

(71) Applicant: FANUC Corporation, Yamanashi (JP)

(72) Inventor: Toshiyuki Ando, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 199 days.

(21) Appl. No.: 14/532,680

(22) Filed: Nov. 4, 2014

(65) Prior Publication Data
US 2015/0124056 A1 May 7, 2015

(30) Foreign Application Priority Data

Nov. 5, 2013 (JP) ................................. 2013-229573

(51) Int. Cl.
G06K 9/00 (2006.01)
G01C 17/38 (2006.01)
G06F 19/00 (2011.01)
H04N 13/02 (2006.01)
B25J 9/16 (2006.01)
G06K 9/52 (2006.01)
G06T 7/00 (2006.01)

(52) U.S. Cl.
CPC ......... H04N 13/0203 (2013.01); B25J 9/1612 (2013.01); B25J 9/1697 (2013.01); G06K 9/52 (2013.01); G06T 7/0042 (2013.01); H04N 13/0246 (2013.01); G05B 2219/40006 (2013.01); G06T 2207/10024 (2013.01); G06T 2207/10028 (2013.01); G06T 2207/30164 (2013.01); Y10S 901/09 (2013.01)

(58) Field of Classification Search
None
See application file for complete search history.

(56) References Cited

U.S. PATENT DOCUMENTS

| 6,721,444 | B1* | 4/2004 | Gu | B25J 9/1697 345/419 |
| 7,084,900 | B1* | 8/2006 | Watanabe | G06K 9/6203 348/94 |
| 7,177,459 | B1* | 2/2007 | Watanabe | B25J 9/1697 382/151 |
| 7,359,817 | B2* | 4/2008 | Ban | B25J 9/1692 356/2 |
| 7,966,094 | B2* | 6/2011 | Ban | B25J 9/1697 700/213 |
| 2004/0122552 | A1* | 6/2004 | Ban | B25J 9/1697 700/214 |
| 2010/0004778 | A1* | 1/2010 | Arimatsu | B25J 9/1697 700/214 |

(Continued)

FOREIGN PATENT DOCUMENTS

| JP | 4-331081 A | 11/1992 |
| JP | 2001-352440 A | 12/2001 |

(Continued)

Primary Examiner — Joseph Ustaris
Assistant Examiner — Rebecca Volentine
(74) Attorney, Agent, or Firm — Hauptman Ham, LLP

(57) ABSTRACT

An article pickup device configured so as to select a first and second three-dimensional points present in the vicinity of each other based on position information of the plurality of three-dimensional points acquired by a three-dimensional measurement instrument and image data acquired by a camera, acquire an image gradient information in a partial image region including points on an image corresponding to these three-dimensional points, judge whether the first and second three-dimensional points are present on the same article based on a position information of the three-dimensional points and the image gradient information, and add the first and second three-dimensional points to the same connected set when it is judged that the first and second three-dimensional points are present on the same article.

8 Claims, 11 Drawing Sheets

(56) References Cited

U.S. PATENT DOCUMENTS

| | | | | |
|---|---|---|---|---|
| 2012/0121135 A1* | 5/2012 | Kotake | G01S 5/163 | |
| | | | | 382/103 |
| 2013/0158947 A1* | 6/2013 | Suzuki | G01B 11/00 | |
| | | | | 702/155 |
| 2013/0238128 A1* | 9/2013 | Suzuki | B25J 9/1669 | |
| | | | | 700/258 |
| 2014/0067317 A1* | 3/2014 | Kobayashi | B25J 9/1697 | |
| | | | | 702/153 |

FOREIGN PATENT DOCUMENTS

| | | |
|---|---|---|
| JP | 2004-295223 A | 10/2004 |
| JP | 2005-331285 A | 12/2005 |
| JP | 2010-039999 A | 2/2010 |
| JP | 2011-100175 A | 5/2011 |
| JP | 2011-179909 A | 9/2011 |
| JP | 2013-184279 A | 9/2013 |

\* cited by examiner

APPARATUS AND METHOD FOR PICKING UP ARTICLE DISPOSED IN THREE-DIMENSIONAL SPACE USING ROBOT

RELATED APPLICATIONS

The present application claims priority to Japanese Application Number 2013-229573, filed Nov. 5, 2013, the disclosure of which is hereby incorporated by reference herein in its entirety.

BACKGROUND OF THE INVENTION

1. Field of the Invention

The present invention relates to an article pickup apparatus and an article pickup method for recognizing a position and a posture of an article disposed in a three-dimensional space and for picking up the recognized article using a robot.

2. Description of the Related Art

As an apparatus of this type, conventionally, there is known an apparatus configured to recognize a position of an article by pattern matching with respect to a two-dimensional image obtained by imaging articles disposed in a three-dimensional space using a camera or a three-dimensional point set obtained via measurement using a three-dimensional measurement instrument. Such an apparatus is described, for example, in Japanese Laid-open Patent Publication No. 2004-295223 (JP2004-295223A) and Japanese Laid-open Patent Publication No. 2011-179909 (JP2011-179909A). Further, there is also known an apparatus configured to extract an article in an image using image data obtained by imaging articles disposed in a three-dimensional space using a camera. An apparatus of this type is described, for example, in Japanese Laid-open Patent Publication No. 2010-039999 (JP2010-039999A).

In the apparatus described in JP2004-295223A, a two-dimensional model pattern is prepared from a two-dimensional image obtained by previously imaging an article in a standard three-dimensional relative posture, and then a plurality of transform two-dimensional model patterns are prepared by applying two-dimensional geometric transform to the two-dimensional model pattern to perform two-dimensional pattern matching with respect to a two-dimensional image of an article using the plurality of transform two-dimensional model patterns.

In the apparatus described in JP2011-179909A, while a three-dimensional model pattern of an article is previously acquired from a CAD model or the like, surfaces of articles in a three-dimensional space are measured using a three-dimensional measurement instrument and a three-dimensional point set (a distance image) is acquired, and then the three-dimensional point set is divided into partial regions surrounded by an edge extracted from the three-dimensional point set. Then, initially, one of the partial regions is set as an article region, and both matching processing of the three-dimensional model pattern for the article region and update processing for adding another partial region to the article region are repeated to measure positions and postures of the articles.

In the apparatus described in JP2010-039999A, a color image and a distance image of a region including an article are acquired by an imaging operation of a camera, and then the acquired images are displayed on a display part. When a part of the article in the displayed image is taught by a user as a foreground region, a region other than the article is set as a background region based on color information of a color image and distance information obtained from a distance image to extract the article in the image.

However, in the apparatuses described in JP2004-295223A and JP2011-179909A, it is necessary to previously prepare a two-dimensional model pattern or a three-dimensional model pattern for each kind of articles, resulting in a need for time and effort. In particular, when there are a large number of different articles, it is necessary to prepare model patterns corresponding to the number of different articles, and therefore, much time and effort are necessary.

In the apparatus described in JP2010-039999A, in order to extract an article in an image, a teaching operation by a user is necessary, resulting in a need for time and effort. In particular, when there are a large number of different articles, it is necessary to perform teaching operations corresponding to the number of different articles, and therefore, much time and effort are necessary.

SUMMARY OF THE INVENTION

An article pickup apparatus according to an aspect of the present invention includes: a robot including a hand capable of holding an article; a three-dimensional measurement instrument measuring surface positions of a plurality of articles disposed in a three-dimensional space to acquire position information of a plurality of three-dimensional points; a camera imaging an area including the plurality of articles to acquire image data; a connected set calculation part determining a connected set made by connecting three-dimensional points present in the vicinity of each other among the plurality of three-dimensional points, based on the position information of the plurality of three-dimensional points acquired by the three-dimensional measurement instrument and the image data acquired by the camera; an article identification part identifying a position and posture of the article, based on the position information of the three-dimensional points belonging to the connected set; a hand position posture calculation part determining a hand position posture as a position and a posture of the hand capable of picking up the article identified by the article identification part; and a robot control part controlling the robot so as to move the hand to the hand position posture determined by the hand position posture calculation part to pick up the article. The connected set calculation part includes: a three-dimensional point selection part selecting a first three-dimensional point and a second three-dimensional point present in the vicinity of each other among the plurality of three-dimensional points acquired by the three-dimensional measurement instrument; a gradient information acquisition part acquiring an image gradient information indicating a gradient state of a surface of the article in a partial image region including points on an image corresponding to respective the first three-dimensional point and the second three-dimensional point, based on the image data acquired by the camera; and a judgment part judging whether the first three-dimensional point and the second three-dimensional point are present on the same article, based on a position information of the first three-dimensional point, a position information of the second three-dimensional point, and the image gradient information acquired by the gradient information acquisition part, and, when the judgment part judges that the first three-dimensional point and the second three-dimensional point are present on the same article, the connected set calculation part adds the first three-dimensional point and the second three-dimensional point to the same connected set.

Another aspect of the present invention is an article pickup method for picking up an article disposed in a three-dimensional space using a robot including a hand capable of holding the article, the method including: measuring, by a three-dimensional measurement instrument, surface positions of a plurality of articles disposed in the three-dimensional space to acquire position information of a plurality of three-dimensional points; imaging, by a camera, an area including the plurality of articles to acquire image data; determining a connected set made by connecting the three-dimensional points present in the vicinity of each other among the plurality of three-dimensional points, based on the position information of the plurality of three-dimensional points acquired by the three-dimensional measurement instrument and the image data acquired by the camera; identifying a position and posture of the article, based on the position information of the three-dimensional points belonging to the connected set; determining a hand position posture as a position and posture of the hand capable of picking up the article, the position and posture of which are identified; and controlling the robot so as to move the hand to the hand position posture to pick up the article. The determining the connected set includes: selecting a first three-dimensional point and a second three-dimensional point present in the vicinity of each other among the plurality of three-dimensional points acquired by the three-dimensional measurement instrument; acquiring an image gradient information indicating a gradient state of a surface of the article in a partial image region including points on an image corresponding to respective first three-dimensional point and second three-dimensional point, based on the image data acquired by the camera; judging whether the first three-dimensional point and the second three-dimensional point are present on the same article, based on a position information of the first three-dimensional point, a position information of the second three-dimensional point, and the image gradient information; and adding the first three-dimensional point and the second three-dimensional point to the same connected set when it is judges that the first three-dimensional point and the second three-dimensional point are present on the same article.

BRIEF DESCRIPTION OF THE DRAWINGS

Objects, features, and advantages of the present invention will become further apparent from the following description of an embodiment when taken with the accompanying drawings in which.

DETAILED DESCRIPTION

Figure 1:
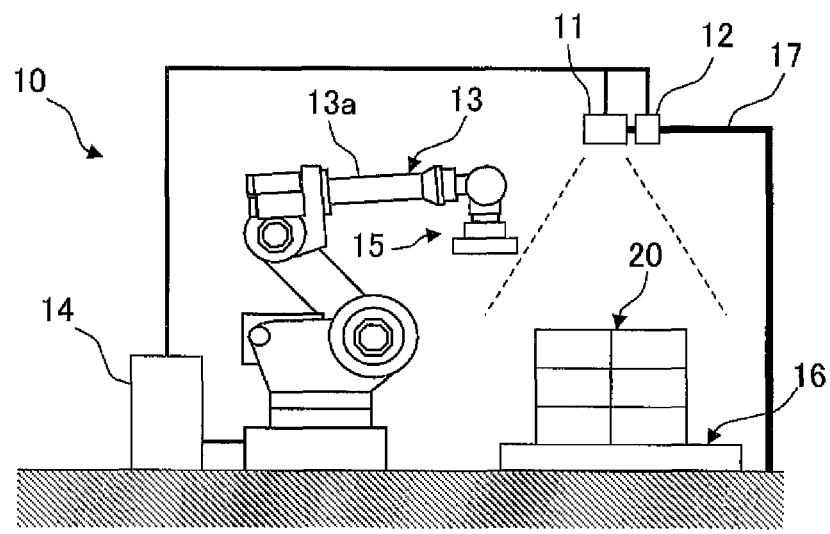
FIG. 1 is a view illustrating a schematic configuration of an article pickup apparatus according to one embodiment of the present invention.

Hereinafter, with reference to FIG. 1 to FIG. 17, an article pickup apparatus according to the embodiment of the present invention will be described. FIG. 1 is a view illustrating a schematic configuration of an article pickup apparatus 10 according to one embodiment of the present invention. The article pickup apparatus 10 includes a three-dimensional measurement instrument 11, a camera 12, a robot 13, and a robot control device 14 for controlling the robot 13 by connecting the three-dimensional measurement instrument 11 and the robot 13. The robot 13 includes a hand 15 mounted on a tip of an arm 13a. A pallet 16 is disposed sideward of the robot 13. Together therewith, FIG. 1 illustrates an orthogonal three-axis coordinate system of X, Y, and Z. The Z-direction is a vertical direction, and the X-direction and the Y-direction are horizontal directions.

On the pallet 16, a plurality of articles 20 are disposed. The article pickup apparatus 10 of the present embodiment recognizes a position and a posture of an article 20 to be picked up while the plurality of articles 20 are disposed, picks up and holds the recognized article 20 using the hand 15, and conveys the article 20 to a predetermined position by an operation of the robot 13. In FIG. 1, the plurality of articles 20 are illustrated so as to have the same shape as each other, but may be composed of a plurality of different articles having shapes different from each other. In the following description, in some cases, the article 20 to be held by the hand 15 is expressed using a sign 21 (refer to FIG. 11) for discrimination from another article on the pallet 16.

The three-dimensional measurement instrument 11 is disposed above a center portion of the pallet 16 and measures a surface of an exposed article 20 among the articles 20 disposed on the pallet 16 to acquire position information (three-dimensional information) of a plurality of three-dimensional points. A measurement range of the three-dimensional measurement instrument 11 needs to include the pallet 16 but an excessively large measurement range decreases measurement resolution. Therefore, preferably, the measurement range is equivalent to an occupied range of the pallet 16 and, for example, accords with the occupied range of the pallet 16. In FIG. 1, the three-dimensional measurement instrument 11 is fixed to a dedicated cradle 17 but may be mounted on a tip of the robot 13. The three-dimensional measurement instrument 11 and the robot control device 14 are connected to each other via a communication part such as a communication cable so as to be communicable with each other.

As the three-dimensional measurement instrument 11, various non-contact types can be used. Such types include, for example, a stereotype using two cameras, a scanning type using laser slit light, a scanning type using laser spot light, a type of projecting pattern light on an article using a device such as a projector, and a type of utilizing a flight time from emission of light from a projector to incidence to a light receiver via reflection on an article surface.

The three-dimensional measurement instrument 11 expresses the acquired three-dimensional information as the format of a distance image or a three-dimensional map. The distance image is an image in which three-dimensional information is expressed as an image format, and expresses a height of a position on an image or a distance from the three-dimensional measurement instrument 11 using brightness or a color of each pixel of the image. On the other hand, the three-dimensional map is a map in which three-dimensional information is expressed as a set of measured three-dimensional coordinate values (x, y, z). In the present embodiment, each pixel in a distance image or a point having three-dimensional coordinate values in a three-dimensional map is referred to as a three-dimensional point, and a set including a plurality of three-dimensional points is referred to as a three-dimensional point set. The three-dimensional point set is a set of all the three-dimensional points measured using the three-dimensional measurement instrument 11 and can be acquired using the three-dimensional measurement instrument 11.

The camera 12 includes an imaging device such as a CCD, and is disposed above a center portion of the pallet 16 to image articles 20 disposed on the pallet 16. A photographing region of the camera 12 needs to include the pallet 16 but an excessively large photographing region causes a decrease of imaging resolution. Therefore, preferably, a photographing region is equivalent to an occupied range of the pallet 16 and, for example, accords with the occupied range of the pallet 16. In FIG. 1, the camera 12 is fixed to the dedicated cradle 17 but may be mounted on a tip of the robot 13. The camera 12 and the robot control device 14 are connected to each other via a communication part such as a communication cable so as to be communicable with each other.

The camera 12 is previously calibrated, and use of calibration data makes it possible to determine a correspondence relation between a three-dimensional point measured using the three-dimensional measurement instrument 11 and a point (a two-dimensional point) on an image captured using the camera 12. In other words, it can be determined which point in a camera image a three-dimensional point corresponds to, whereby image data corresponding to a certain three-dimensional point becomes obtainable.

The hand 15 can pick up and also hold the article 20, and examples of a configuration of the hand capable of performing such operations include, for example, a suction nozzle, an attracting magnet, and a suction pad or chuck. An operation of the robot 13 controls a position posture of the hand 15.

Figure 2:
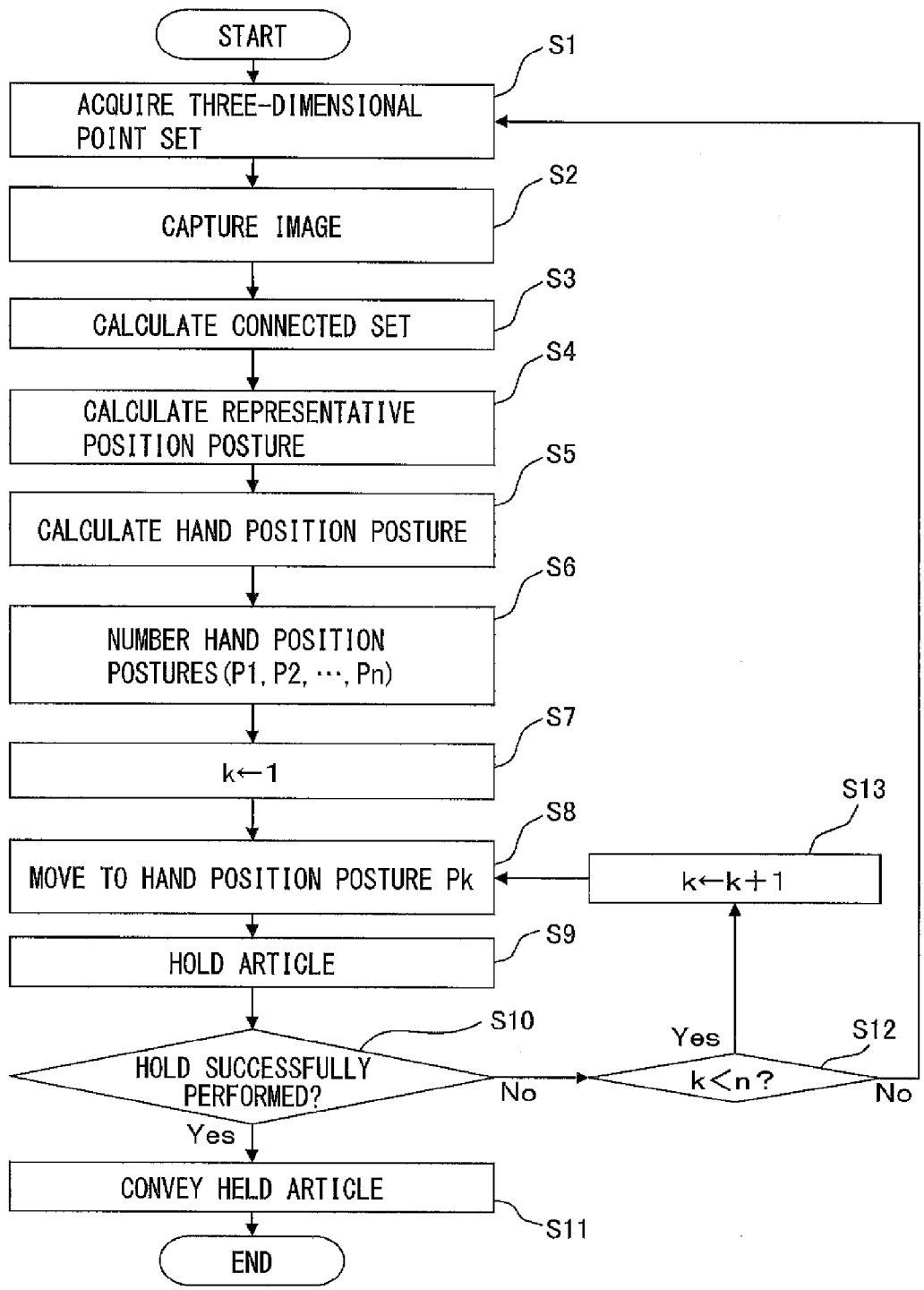
FIG. 2 is a flowchart illustrating one example of processing executed in a robot control device of FIG. 1.

FIG. 2 is a flowchart illustrating one example of processing executed in the robot control device 14 and specifically, one example of processing for article pickup. An operation of the article pickup device 10 will be described below with reference to the flowchart of FIG. 2 and drawings associated therewith.

Figure 3:
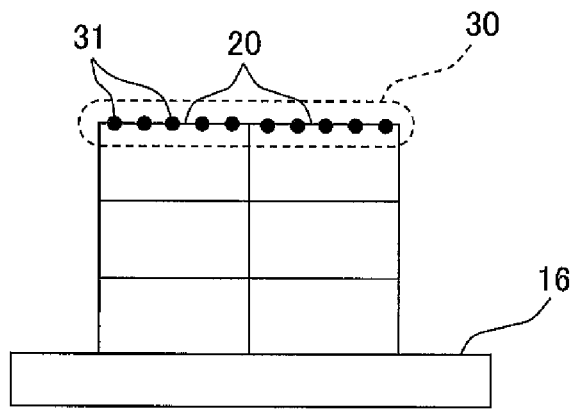
FIG. 3 is a view illustrating one example of a three-dimensional point set acquired using a three-dimensional measurement instrument of FIG. 1.

Processing of FIG. 2 is started when, for example, a pickup start command of an article 20 is input by operating an operation switch not illustrated. Initially, surfaces of a plurality of articles 20 disposed in a three-dimensional space are measured using the three-dimensional measurement instrument 11 and a three-dimensional point set 30 is acquired (step S1). FIG. 3 is a view illustrating one example of the three-dimensional point set 30 acquired using the three-dimensional measurement instrument 11 and three-dimensional points 31 configuring the three-dimensional point set 30. In FIG. 3, the three-dimensional points 31 are illustrated with black circles and the three-dimensional point set 30 is illustrated as a region surrounded by a dotted line including all the black circles.

Figure 4:
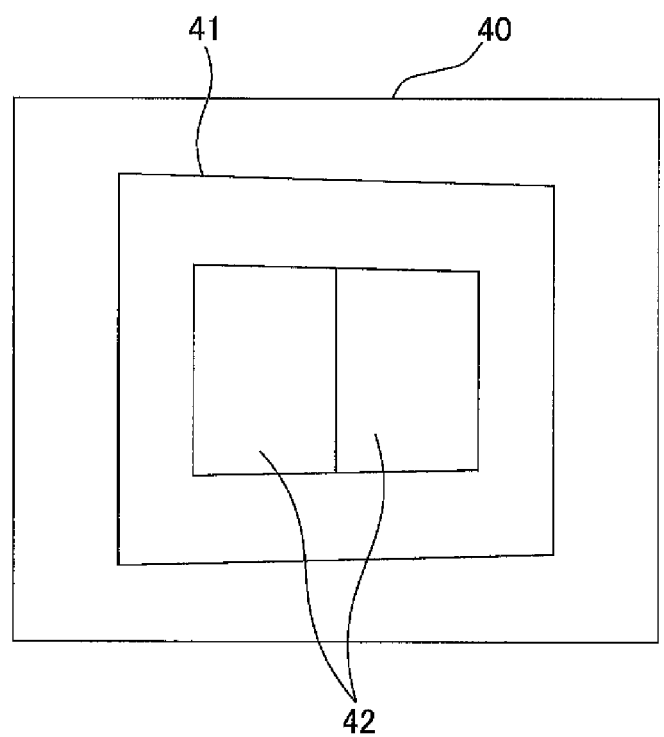
FIG. 4 is a view illustrating one example of an image captured using a camera of FIG. 1.

Then, a region including a plurality of articles 20 is imaged using the camera 12 and an image 40 is acquired (step S2). FIG. 4 is a schematic view illustrating one example of the image 40 captured using the camera 12. FIG. 4 illustrates a pallet image 41 expressing the pallet 16 and an article image 42 expressing the article 20.

Figure 5:
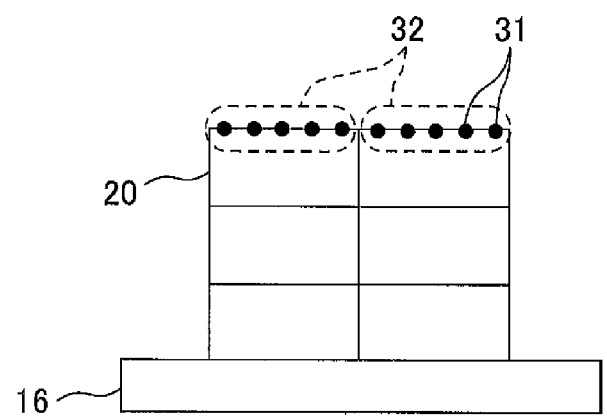
FIG. 5 is a view illustrating one example of a connected set determined from the three-dimensional point set of FIG. 3.

Then, at least one connected set 32 is determined from the three-dimensional point set 30 (step S3). FIG. 5 is a view illustrating one example of the connected set 32 determined from the three-dimensional point set 30. FIG. 5 illustrates the connected set 32 as a region surrounded by a dotted line. In other words, FIG. 5 illustrates two connected sets 32.

Figure 6:
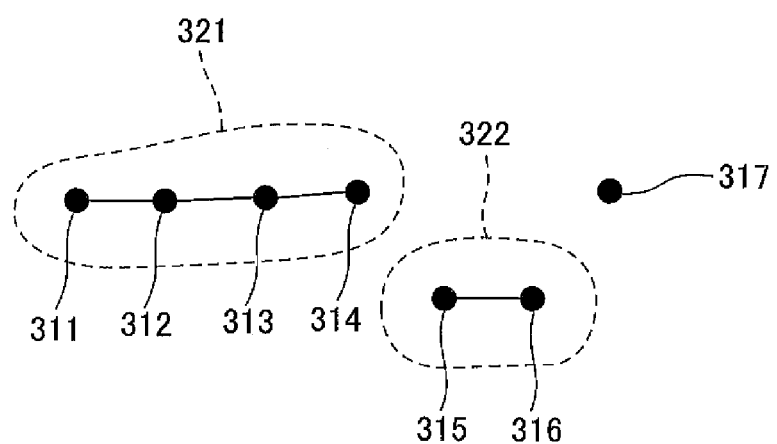
FIG. 6 is a conceptual view illustrating connected sets.

The connected set 32 referred to here is a partial set of the three-dimensional point set 30, and when in the vicinity of an arbitrary three-dimensional point (a first three-dimensional point) 31, another three-dimensional point (a second three-dimensional point) 31 different from the former three-dimensional point 31 is present, the connected set 32 is a set where the first three-dimensional point 31 and the second three-dimensional point 31 are connected. FIG. 6 is a view illustrating a concept of the connected set 32. In FIG. 6, when a distance between the first three-dimensional point 31 and the second three-dimensional point 31 next to each other falls within a predetermined value, the first three-dimensional point 31 and the second three-dimensional point 31 are connected with each other.

In other words, as illustrated in FIG. 6, when a plurality of three-dimensional points 31 (expressed by 311 to 317) are measured using the three-dimensional measurement instrument 11 and of these, 311 and 312, 312 and 313, 313 and 314, and 315 and 316 are present within a predetermined distance, these points are connected with each other. In this case, 311 and 314 are also connected via 312 and 313 and therefore, 311 to 314 configure the same connected set 321. On the other hand, 315 and 316 are not connected to any of 311 to 314 and therefore, configure another connected set 322. Since not being connected to any three-dimensional point, 317 configures no connected set.

Figure 13:
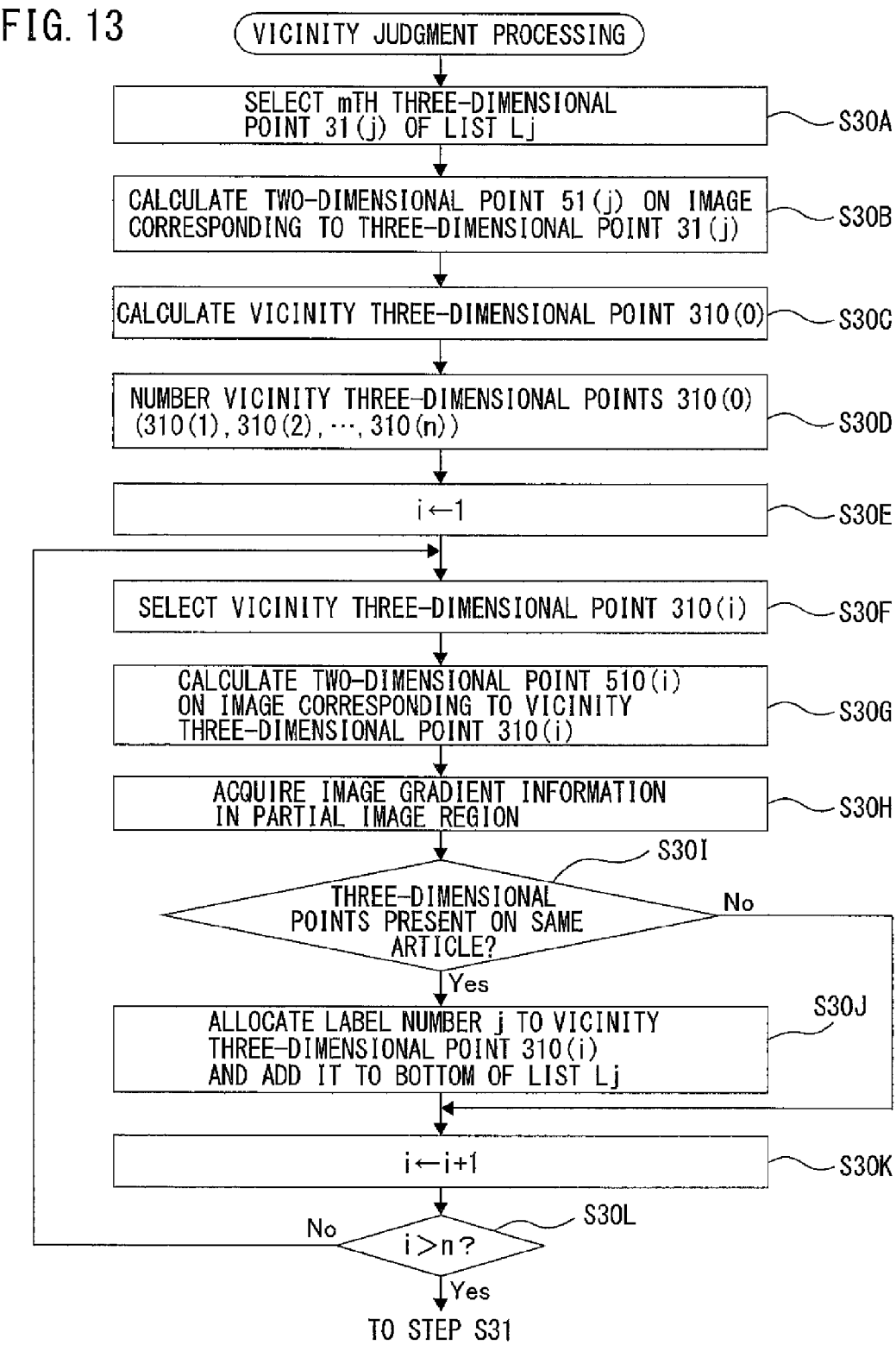
FIG. 13 is a flowchart illustrating details of vicinity judgment processing of FIG. 12.

In the present embodiment, the connected set 32 is configured so that a single connected set 32 corresponds to a single article 20, i.e., the article 20 and the connected set 32 correspond to each other on a one-to-one basis. Thereby, the article 20 is identified using the connected set 32. In this case, using not only measurement data from the three-dimensional measurement instrument 11 but also image data from the camera 12, the connected set 32 is determined. Specific processing for determining the connected set 32 will be described later (FIG. 13).

Figure 7:
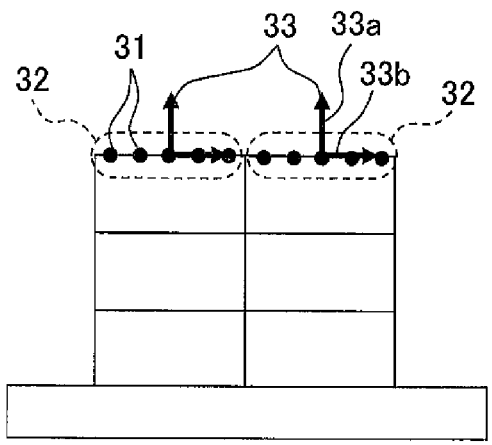
FIG. 7 is a view illustrating one example of a representative position posture based on positions of three-dimensional points belonging to each connected set of FIG. 6.

Then, on the basis of positions of the three-dimensional points 31 belonging to the same connected set 32, a representative position posture 33 representing each connected set 32 is determined (step S4). The connected set 32 identifies a surface where the article 20 is exposed, and the representative position posture 33 refers to a position and a posture representing the article 20. FIG. 7 is a view illustrating one example of the representative position posture 33 calculated based on positions of the three-dimensional points 31 belonging to the connected set 32. The representative position posture 33 is illustrated using a pair of arrows 33a and 33b intersecting at a right angle, since the representative position posture 33 is expressed in an orthogonal coordinate system. In FIG. 7, the representative position posture 33 is illustrated using the two arrows 33a and 33b but the representative position posture 33 is not present in a two-dimensional space but in a three-dimensional space.

There are several methods for determining the representative position posture 33. Initially, as a first example, there is available a method in which a gravity center position of three-dimensional points 31 belonging to the connected set 32 and a predetermined posture (for example, a posture where the arrow 33a is directed upward in a vertical direction) are combined to obtain the representative position posture 33. To calculate the gravity center position, all the three-dimensional points 31 belonging to the connected set 32 are employable, or three-dimensional points 31 selected by separately introducing processing such as outlier countermeasures are also employable. For the outlier countermeasures, for example, initially, a gravity center position is determined using all the three-dimensional points 31 belonging to the connected set 32 for gravity center calculation, and when three-dimensional points 31 having at least a predetermined value of a distance from the gravity center position exist among the three-dimensional points 31 used for gravity center calculation, three-dimensional points 31 of a predetermined ratio are eliminated from the three-dimensional points 31 used for gravity center calculation in descending order of the distance from the gravity center position. Then, the remaining three-dimensional points 31 are used for gravity center calculation to recalculate a gravity center position. This processing may be repeated until all the three-dimensional points 31 used for gravity center calculation fall within the predetermined distance from the gravity center position.

As a second example, there is available a method in which a rectangle (a circumscribed rectangle) circumscribed to three-dimensional points 31 belonging to the connected set 32 is determined to allow a position posture of the center of the circumscribed rectangle to be the representative position posture 33. To determine the circumscribed rectangle, initially, using all the three-dimensional points 31 included in the connected set 32, a plane is determined in a three-dimensional space and then all the three-dimensional points 31 included in the connected set 32 are projected onto this plane. Then, a convex polygon internally including all the projected three-dimensional points 31 is calculated and a rectangle circumscribed to the calculated convex polygon is determined. The plane may be determined by a least-squares method using all the three-dimensional points 31 belonging to the connected set 32 or by separately introducing any processing for outlier countermeasures. As a method for outlier countermeasures, several methods such as an M-estimation method, RANSAC, LMedS, and Hough transform are available. As a method for calculating a convex polygon, Andrew's Algorithm method and the like can be employed. As a method for calculating a rectangle circumscribed to a convex polygon, a rotating calipers method and the like can be employed. FIG. 7 illustrates a case where the representative position posture 33 is determined based on the first example.

Figure 8:
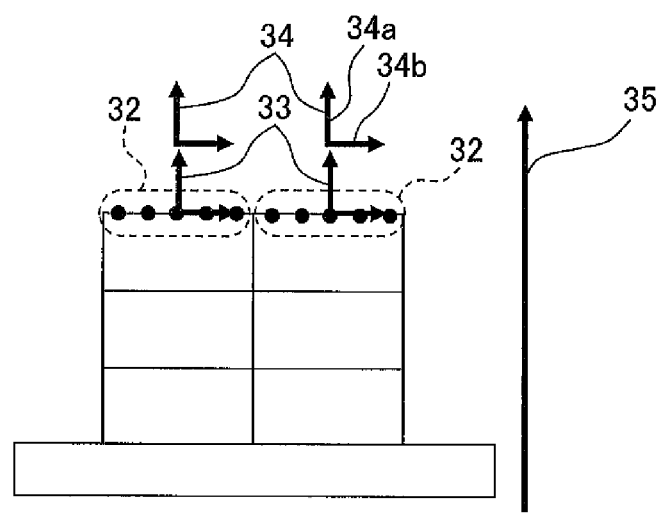
FIG. 8 is a view illustrating one example of a hand position posture corresponding to the representative position posture of FIG. 7.

Then, a hand position posture 34 corresponding to each representative position posture 33 is determined (step S5). FIG. 8 is a view illustrating one example of the hand position posture 34 corresponding to the representative position posture 33. The hand position posture 34 is illustrated using a pair of arrows 34a and 34b intersecting at right angles in the same manner as for the representative position posture 33.

As a method for determining a position (an intersection of the arrows 34a and 34b) and a posture (directions of the arrows 34a and 34b) of the hand position posture 34, several methods are available for each. Regarding the position, a method in which, for example, a position of the representative position posture 33 is directly assigned as a position of the hand position posture 34 can be employed. As another example, there is also a method in which a position moved by a predetermined length in a direction of a predetermined coordinate axis 35 (e.g., Z-axis) from a position of the representative position posture 33 is specified as a position of the hand position posture 34. FIG. 8 illustrates a position based on the latter example. Regarding the posture, a method in which, for example, a posture of the representative position posture 33 is directly assigned as a posture of the hand position posture 34 is available. As another example, there is also a method in which a posture rotated at a predetermined angle around the predetermined coordinate axis 35 of the representative position posture 33 is specified as a posture of the hand position posture 34. FIG. 8 illustrates a posture based on the former example.

Figure 9:
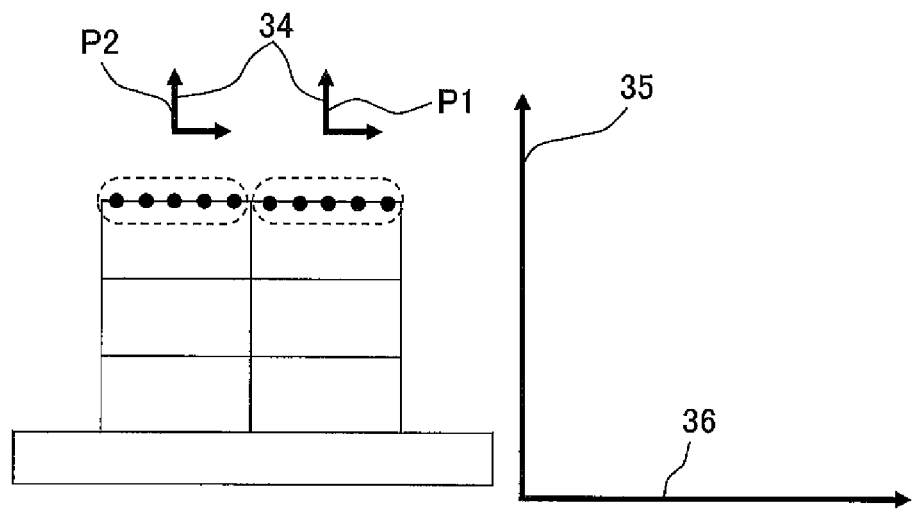
FIG. 9 is a view illustrating one example of numbering for the hand position posture of FIG. 8.

Then, the respective hand position postures 34 are numbered as P1, P2, ..., Pn (step S6). Here, n represents the number of hand position postures 34. FIG. 9 is a view illustrating the numbered hand position postures 34 and numbering is performed in descending order of a coordinate value with respect to the predetermined coordinate axis 35, i.e., in order from a value at a higher position. As illustrated in FIG. 9, when coordinate values with respect to the coordinate axis 35 are the same, numbering is performed in descending order of a coordinate value with respect to a predetermined coordinate axis 36 (for example, X-axis) at right angles to the coordinate axis 35. In FIG. 9, n=2.

Then, an initial value is provided for a variable k having a natural number. In other words, processing for k←1 is executed (step S7). The variable k is used for specifying a number for the hand position posture 34.

Figure 10:
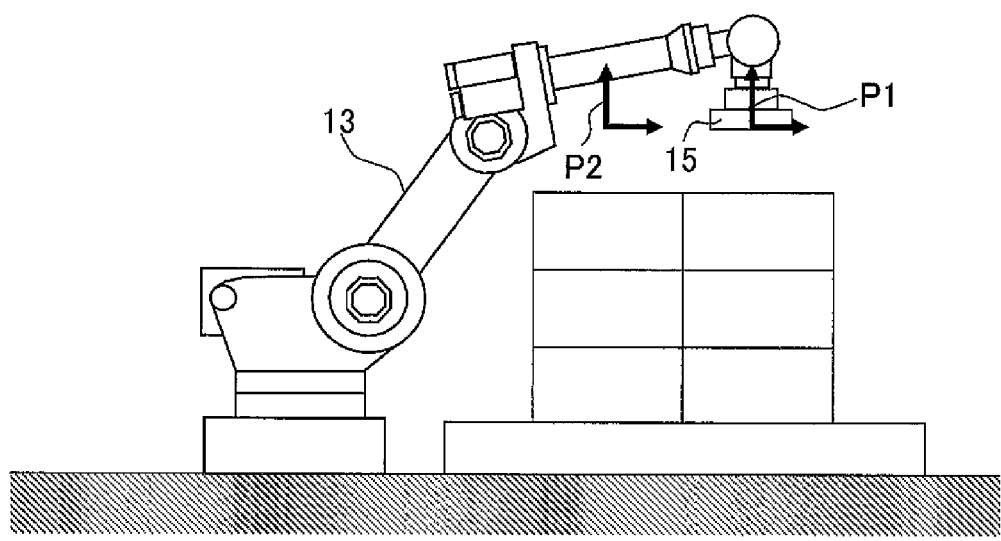
FIG. 10 is a view illustrating one example of an operation of the article pickup apparatus according to the embodiment of the present invention.

Then, as illustrated in FIG. 10, a control signal is output to a robot driving actuator (an electric motor) and the hand 15 is moved to a hand position posture Pk by an operation of the robot 13 (step S8). Regarding an initial value of the variable: k=1, Pk=P1.

Figure 11:
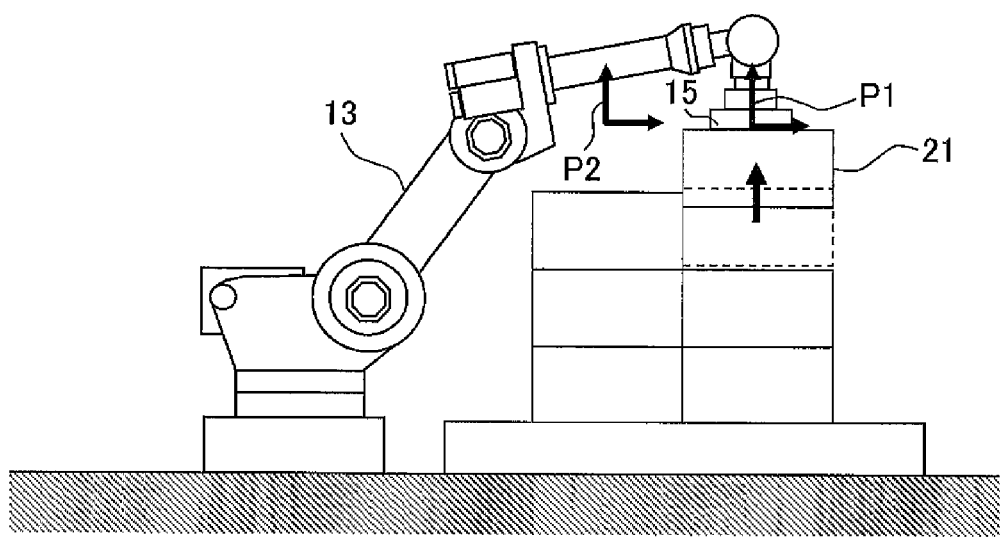
FIG. 11 is a view illustrating one example of an operation following the operation in FIG. 10.

Then, a control signal for holding the article 20 is output to a hand driving actuator and as illustrated in FIG. 11, an article 21 is held by a lower end surface of the hand 15 (step S9). When, for example, the hand 15 includes a suction nozzle, a vacuum pump is operated to suck and hold the article 21 by a suction force. When the hand 15 includes an attracting magnet, current is allowed to flow in an electromagnetic coil and the magnet is operated to attract and hold the article 21 by a magnetic force. When the hand 15 includes a chuck, the article 21 is held by opening or closing the chuck.

Then, it is judged whether the hand 15 has succeeded in holding the article 21 (step S10). Regarding this judgment, when the hand 15 includes a suction nozzle, it may be judged whether the hold has been successfully performed, according to a change of a flow rate or pressure of air during suction. When the hand 15 includes an attracting magnet, it is possible to judge whether the article 21 is present using a proximity sensor and then to judge whether a hold has been successfully performed, according to the presence or absence thereof. When the hand 15 includes a chuck, it is possible to judge whether a hold has been successfully performed by confirming an opening or closing state of the chuck using an opening/closing confirmation sensor. When it is judged that the hold has been successfully performed, the processing moves to step S11. When it is judged that the hold has not been successfully performed, the processing moves to step S12.

In step S12, it is judged whether the variable k is smaller than n. This judgment is a judgment whether any hand position posture which the hand 15 has not reached yet exists among n (2 in FIG. 11) hand position postures 34. When k<n is judged, the hand 15 has not reached yet a hand position posture Pk+1 and therefore, processing for k←k+1 is executed (step S13) and then the processing returns to step S8. When it is judged that k<n is not satisfied in step S12, the hand 15 has reached all n hand position postures 34 and therefore, the processing returns to step S1.

In step S11, a control signal is output to the robot driving actuator to move the hand 15 to a predetermined position. Thereby, the article 21 is conveyed to the predetermined position by an operation of the robot 13. Thereafter, a control signal is output to the hand driving actuator to remove the article 21 from the hand 15. This indicates the end of one cycle of the processing.

In the above description, processing in the robot control device 14 acquires a three-dimensional point set 30 including a plurality of three-dimensional points 31 by measuring surface positions of a plurality of articles 20 using the three-dimensional measurement instrument 11 (step S1); determines a connected set 32 made by connecting three-dimensional points 31 present in the vicinity of each other from the three-dimensional point set 30 (step S3); determines a position posture (a hand position posture 34) of the hand 15 capable of picking up the article 20 based on position information of the three-dimensional points 31 belonging to the connected set 32 (step S4 and step S5); and further controls the robot 12 so as to pick up the article 20 on the pallet 16 by moving the hand 15 to the determined hand position posture 34 (step S8 to step S11).

The connected set 32 reflects a position and a posture (inclination) of an article surface and therefore, use of the connected set 32 makes it possible to identify a position and a posture of the article 20 without pattern matching, a teaching operation by a user, and the like. Therefore, a model pattern of the article 20 does not need to be prepared, and regarding even a large number of different types of articles 20 differing in shape, it is possible to easily recognize positions and postures thereof to hold the articles 20. Further, also regarding a new kind of article 20 added, it is possible to easily recognize a position and a posture thereof without addition of a model pattern, a teaching operation by a user, and the like.

When a plurality of articles 20 having the same shape are disposed next to each other, there is a possibility that the first three-dimensional point 31 and the second three-dimensional point 31 are measured on articles 20 different from each other. At that time, upon calculating a distance between the first three-dimensional point 31 and the second three-dimensional point 31, the distance falling within a predetermined value, when the first three-dimensional point 31 and the second three-dimensional point 31 are configured so as to belong to the same connected set 32 assuming that the first three-dimensional point 31 and the second three-dimensional point 31 are present in the vicinity of each other, the connected set 32 is configured across a plurality of articles 20. In order to avoid this problem, in the present embodiment, the connected set 32 is calculated as described below.

Figure 12:
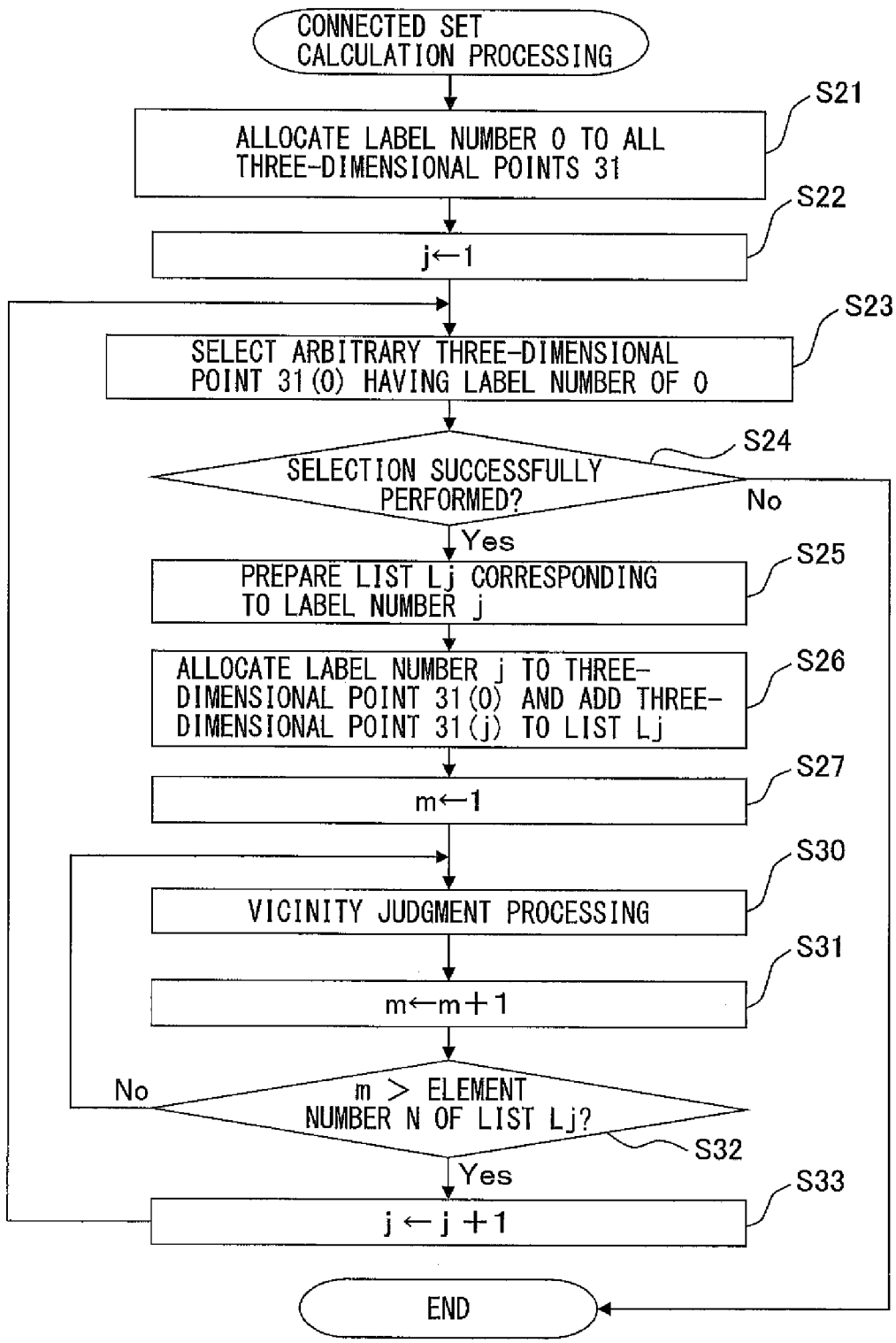
FIG. 12 is a flowchart illustrating details of processing for determining the connected set of FIG. 2.

FIG. 12 and FIG. 13 each are a flowchart illustrating one example of processing (connected set calculation processing) for determining the connected set 32 that is a characteristic feature of the present embodiment, i.e., a flowchart specifically illustrating processing in step S3 of FIG. 2.

Initially, step S21 of FIG. 12 allocates all the three-dimensional points 31 belonging to the three-dimensional point set 30 with a label number 0 indicating no belongingness to any connected set 32 as an initial label number. In the following description, a three-dimensional point 31 allocated with a label number j which is a natural number is expressed using 31($j$). The label number j is a number allocated corresponding to the connected set 32, and when the same label number j which is not 0 is allocated, belonging to the same connected set 32 is meant. Then, in step S22, in order to determine a first connected set 32, the label number j is set to be 1 (j←1).

Then, step S23 selects an arbitrary three-dimensional point 31(0) having a label number of 0 which is a three-dimensional point 31 belonging to the three-dimensional point set 30. Step S24 judges whether the three-dimensional point 31(0) having a label number of 0 has been selected, and when a judgment of Yes is made, the processing moves to step S25. When the three-dimensional point 31(0) has not been selected, all the three-dimensional points 31 belonging to the three-dimensional point set 30 belong to any one of the connected sets 32. In this case, a judgment of No is made in step S24 to end the connected set calculation processing and then the processing moves to step S4 of FIG. 2.

Step S25 prepares a list Lj for storing a three-dimensional point 31($j$) having a label number of j. Step S26 allocates the three-dimensional point 31(0) selected in step S24 with a label number j and then adds the three-dimensional point 31($j$) to the list Lj. In step S27, an initial value 1 is provided for a variable m having a natural number value (m←1). The variable m refers to a number specifying the three-dimensional point 31($j$) included in the list Lj. It is assumed that in the list Lj, added three-dimensional points 31($j$) are lined up in order of addition.

In step S30, the following processing (vicinity judgment processing) is executed: i.e., it is judged whether in the vicinity of an mth three-dimensional point 31($j$) of the list Lj, a three-dimensional point 31(0) having a label number of 0 present on the same article 20 exists, and the three-dimensional point 31 (0) judged to exist is added to the list Lj.

FIG. 13 is a flowchart illustrating details of the vicinity judgment processing of step S30. Step S30A selects the mth three-dimensional point 31($j$) of the list Lj. Using the image 40 acquired in step S2, step S30B calculates a two-dimensional point 51($j$) on the image 40 corresponding to the three-dimensional point 31($j$) selected in step S30A. In this case, use of calibration data previously set for the camera 12 makes it possible to calculate the two-dimensional point 51($j$) corresponding to the three-dimensional point 31($j$).

Step S30C calculates a vicinity three-dimensional point set which is a set determined by collecting all the three-dimensional points (vicinity three-dimensional points 310(0)) which are three-dimensional points 31(0) having a label number of 0 and are present in the vicinity of the three-dimensional point 31(*j*) selected in step S30A. The vicinity three-dimensional point 310(0) is, for example, a point having an x-coordinate and a y-coordinate having a difference by at most a predetermined value from an x-coordinate and a y-coordinate of the selected three-dimensional point 31(*j*), respectively. It is possible that a point having an x-coordinate, a y-coordinate, and a z-coordinate having a difference by at most a predetermined value from an x-coordinate, a y-coordinate, and a z-coordinate of the selected three-dimensional point 31(*j*), respectively, is designated as the vicinity three-dimensional point 310(0) or a point having a Euclidean distance falling within a predetermined value is designated as the vicinity three-dimensional point 310(0). The vicinity three-dimensional point 310(0) is a three-dimensional point 31(*j*) predicted to be present on the same article and becomes a candidate of the three-dimensional point 31(*j*) having a label number of j.

Step S30D numbers all the vicinity three-dimensional points 310(0) belonging to a vicinity three-dimensional point set as 310(1), 310(2), . . . , 310(*n*). In step 30E, an initial value of 1 is provided for a variable i having a natural number value. In other words, processing for i←1 is executed. Step S30F selects a numbered vicinity three-dimensional point 310(*i*). Using calibration data of the camera 12, step S30G calculates a vicinity two-dimensional point 510(*i*) which is a point on the image 40 corresponding to the vicinity three-dimensional point 310 (*i*).

Step S30H acquires image gradient information of a region (a partial image region) including the two-dimensional point 51(*j*) on the image 40 calculated in step S30B and the two-dimensional point 510(*i*) on the image 40 calculated in step S30G. The partial image region refers to a region present within a predetermined distance from a line segment connecting the two-dimensional point 51(*j*) and the two-dimensional point 510(*i*), for example. The image gradient information refers to information of a pixel value having at least a certain contrast (brightness) among filtered images determined by filtering a partial image region using a Sobel filter or the like, for example. In other words, a physical amount indicating a sudden change in brightness between pixels next to each other is acquired as image gradient information. It is also possible to use, as image gradient information, a difference between a pixel value having a minimum brightness and a pixel value having a maximum brightness in the partial image region. Such a change amount in image contrast makes it possible to identify a gradient state of a surface of the article 20.

Step S30I judges whether both the three-dimensional point 31(*j*) selected in step S30A and the vicinity three-dimensional point 310(*i*) selected in step S30F are present on the same article 20, based on the image gradient information acquired in step S30H. This judgment is made by determining whether, for example, a distance between the three-dimensional point 31(*j*) and the vicinity three-dimensional point 310(*i*) is equal to or less than a predetermined value Δd and also a change amount in image contrast in the partial image region is equal to or less than a predetermined value. Regarding the distance between the three-dimensional point 31(*j*) and the vicinity three-dimensional point 310(*i*), it is possible, for example, to previously determine a predetermined distance Δd for each of predetermined coordinate systems from one-dimension to three-dimension and then to judge whether a distance between the three-dimensional point 31(*j*) and the vicinity three-dimensional point 310(*i*) in every predetermined coordinate system is equal to or less than the predetermined value Δd.

When a judgment of Yes is made in step S30I, the processing moves to step S30J, and when a judgment of No is made, the processing passes step S30J and then moves to step 30K. Step S30J allocates a label number j to the vicinity three-dimensional point 310(*i*) selected in step S30F and adds the vicinity three-dimensional point 310(*i*) to the bottom of the list Lj as the three-dimensional point 31(*j*). Step S30K adds 1 to the variable i (i←i+1). Step S30L judges whether the judgment of step S30I has been made for all the vicinity three-dimensional points 310(1) to 310(*n*), i.e., whether the variable i is larger than n. When a judgment of No is made in step S30L, the processing returns to step S30F and the same processing as described above is repeated. When a judgment of Yes is made in step S30L, the vicinity judgment processing (step S30) is ended and the processing moves to step S31 of FIG. 12.

Step S31 adds 1 to the variable m (m←m+1). Step S32 judges whether a value of m is larger than the number (element number N) of three-dimensional points 31(*j*) stored in the list Lj. The case where m is larger than the element number N indicates that the vicinity judgment processing for all N three-dimensional points 31(*j*) stored in the list Lj has been ended and that three-dimensional points present in the vicinity of the three-dimensional points 31(*j*) in the list Lj have been already stored in the same list Lj. Therefore, processing for adding a three-dimensional point 31(*j*) to the list Lj is ended and then the processing moves to step S33. In cases other than the above case, the vicinity judgment processing for all the three-dimensional points 31(*j*) in the list Lj has not been ended and therefore, the processing moves to step S30 to repeat processing for adding a three-dimensional point 31(*j*) to the list Lj.

Step S33 adds 1 to the label number j (j←j+1) and the processing returns to step S23. Thereafter, the same processing as step S23 to step S32 is repeated to determine a connected set 32 corresponding to the next label number j.

The connected set calculation processing described above will be specifically described with reference to FIG. 6 and FIG. 14 to FIG. 16. At the start of connected set calculation processing, all the three-dimensional points 311 to 317 illustrated in FIG. 6 do not belong to the connected set 32 and then a label number for the three-dimensional points 311 to 317 is 0 (step S21). In order to prepare a connected set 32 having a label number of 1 from this state, for example, the three-dimensional point 314 is selected (step S23) and the three-dimensional point 314 is allocated with a label number 1 (314(1)), and thereafter, the three-dimensional point 314 is stored as a first of a list L1 having a label number of 1 (step S26).

Figure 14:
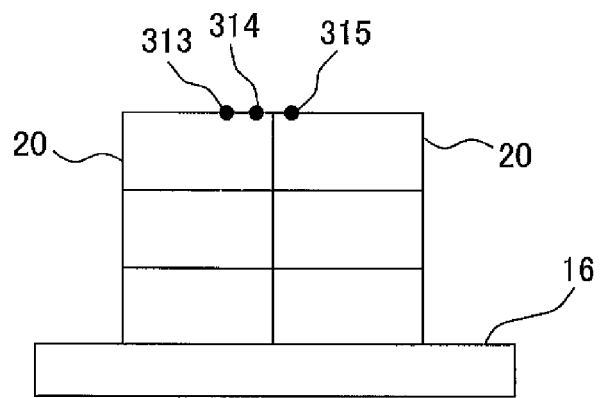
FIG. 14 is a view illustrating one example of three-dimensional points measured on a surface of an article.
Figure 15:
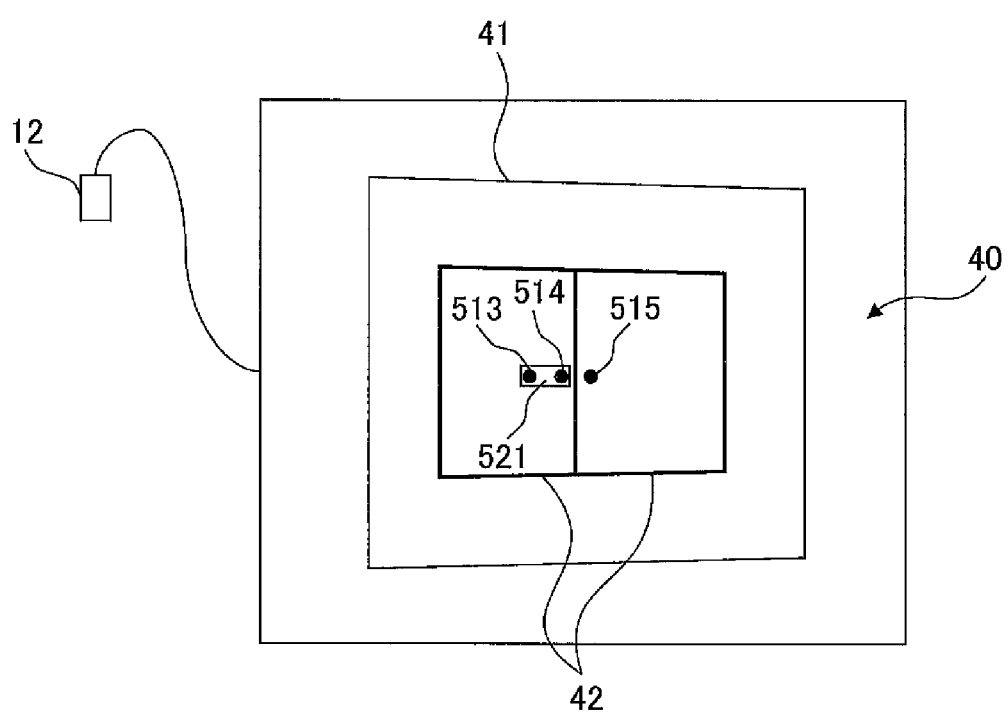
FIG. 15 is a view illustrating one example of two-dimensional points on an image corresponding to the three-dimensional points of FIG. 14.

Then, it is judged whether the three-dimensional point 31(0) having a label number of 0 is present in the vicinity of the first three-dimensional point 314 of the list L1 and on the same article as the article 20 where the three-dimensional point 314 has been measured (step S30). It is assumed that, for example, as illustrated in FIG. 14, the three-dimensional points 313 to 315 are measured on a surface of the article 20; and 313 and 314, and 314 and 315 are separated from each other by the same distance which is at most the predetermined distance Δd, respectively. At that time, as a two-dimensional point 51 on the image 40, two-dimensional points 513 to 515 corresponding to the respective three-dimensional points 313 to 315 as illustrated in FIG. 15 are calculated (step S30G). The two-dimensional points 513 and 514 correspond to the three-dimensional points 313 and 314 on the same article, respectively, and therefore, a change amount in image contrast in a partial image region 521 including the two-dimensional points 513 and 514 is equal to or less than a predetermined value. Therefore, it is judged that the three-dimensional points 313 and 314 are present on the same article (step S30I) and the three-dimensional point 313 is allocated with a label number 1 (313(1)) to be added as a second of the list L1 (step S30J). Thereby, the three-dimensional point 314 and the three-dimensional point 315 are connected, and the element number N of the list L1 becomes 2.

Figure 16:
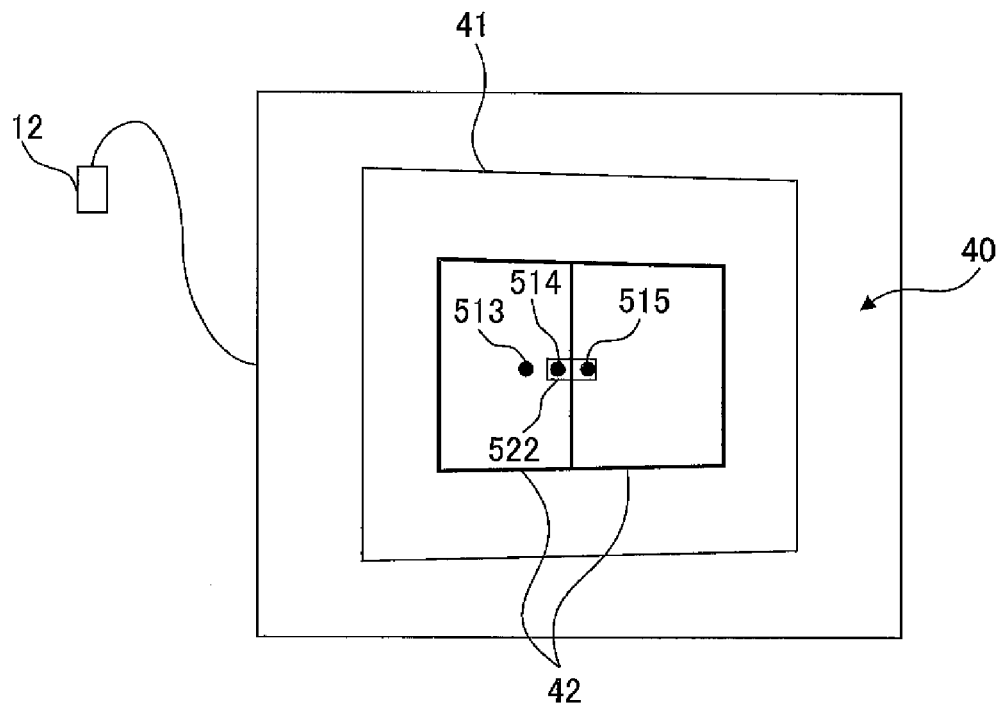
FIG. 16 is a view illustrating another example of two-dimensional points on the image corresponding to the three-dimensional points of FIG. 14.

On the other hand, the two-dimensional points 514 and 515 correspond to the three-dimensional points 314 and 315 on articles different from each other, respectively, and therefore, as illustrated in FIG. 16, a change amount in image contrast in a partial image region 522 including the two-dimensional points 514 and 515 exceeds the predetermined value. Therefore, it is judged that the three-dimensional points 314 and 315 are not present on the same article, and then the three-dimensional point 315 is not added to the same list L1 as for the three-dimensional point 314. When vicinity judgment processing for all the vicinity three-dimensional points 310(0) present in the vicinity of the three-dimensional point 314 is ended, m becomes 2 (<N) (step S31), and in the same manner as described above, it is judged whether the three-dimensional point 31(0) having a label number of 0 is present in the vicinity of the second three-dimensional point 313 of the list L1 on the same article as the article 20 where the three-dimensional point 313 is measured (step S30).

When m is larger than the element number N, preparation of the list L1 having a label number of 1 is ended and the label number is set as 2 (step S33) to repeat the same processing. In repetition processing, for example, a three-dimensional point 315 having a label number of 0 is allocated with a label number 2, and three-dimensional points 315(2) and 316(2) are added to a list L2; and a three-dimensional point 317 having a label number of 0 is allocated with a label number 3 and a three-dimensional point 317(3) is added to a list L3. Thereby, the three-dimensional point 31 having a label number of 0 becomes absent and therefore, a judgment of No is made in step S24 and then the connected set calculation processing is ended.

The present embodiment makes it possible to achieve the following operations and effects.

(1) Processing in the robot control device 14 selects a first three-dimensional point 31 and a second three-dimensional point 31 present in the vicinity of each other from a plurality of three-dimensional points 31 acquired using the three-dimensional measurement instrument 11, (step S30A and step S30F); acquires a image gradient information indicating a gradient state of a surface of the article 20 in a partial image region including points (two-dimensional points 51) on an image corresponding to the respective first three-dimensional point 31 and second three-dimensional point 31, based on image data acquired using the camera 12 (step S30H); judges whether the first three-dimensional point 31 and the second three-dimensional point 31 are present on the same article, based on three-dimensional position information of the first three-dimensional point 31 and the second three-dimensional point 31 and the acquired image gradient information (step S30I); and further allocates the same label number j to these three-dimensional points 31 when it is judged that the first three-dimensional point 31 and the second three-dimensional point 31 are present on the same article to include the three-dimensional points 31 allocated with the number in the same connected set 32.

Therefore, even when, for example, a plurality of articles 20 having the same shape are disposed next to each other, the connected set 32 is not calculated across the plurality of articles 20 and therefore, a single connected set 32 can be allowed to correspond to a single article 20. Accordingly, the connected set 32 makes it possible to accurately recognize the article 20 and then correctly perform an article pickup operation.

(2) Processing in the robot control device 14 calculates two-dimensional points 51 on an image corresponding to the respective first three-dimensional point 31 and second three-dimensional point 31 (step S30B and step 30G); and identifies a partial image region by these two-dimensional points 51 and judges that the first three-dimensional point 31 and the second three-dimensional point 31 are present on the same article when a gradient state in the partial image region does not change (step S30I). Therefore, it can be completely determined whether the first three-dimensional point 31 and the second three-dimensional point 31 are present on the same article.

(3) In this case, the respective two-dimensional points 51 are acquired based on calibration data of the camera 12 and therefore, a two-dimensional point 51 on an image corresponding to the three-dimensional point 31 can be easily determined.

(4) Information of a change amount in image contrast in the partial image region is used as image gradient information and therefore, a gradient state of a surface of the article 20 can be accurately determined.

(5) When a distance between the first three-dimensional point 31 and the second three-dimensional point 31 measured using the three-dimensional measurement instrument 11 is equal to or less than a predetermined value Δd and also a change amount in image contrast in the partial image region is equal to or less than a predetermined value, it is judged that the first three-dimensional point 31 and the second three-dimensional point 31 are present on the same article. Thereby, it can be accurately judged whether a plurality of three-dimensional points 31 are present on the same article.

(6) Processing in the robot control device 14 determines a representative position posture 33 which is a position and a posture representing a connected set 32 based on positions of three-dimensional points 31 belonging to the connected set 32 (step S4); and determines a hand position posture 34 corresponding to this representative position posture 33 (step S5). Thereby, a position relation between the article 20 and the hand 15 can be appropriately set according to a type of the hand 15 and others.

(7) Processing in the robot control device 14 makes it possible to stably hold the article 20 using the hand 15 when determining the representative position posture 33 by combining a gravity center position of all the three-dimensional points 31 belonging to the connected set 32 and a predetermined posture in this gravity center position.

(8) Processing in the robot control device 14 makes it possible to stably calculate the center of the article 20 as the representative position posture 33 and then stably hold the article 20 using the hand 15 even upon existence of a deficit in a three-dimensional point 31 on an article measured using the three-dimensional measurement instrument 11, when determining the representative position posture 33 by combining a center position of a circumscribed rectangle including all the three-dimensional points 31 belonging to the connected set 32 and a predetermined posture.

The article pickup method may be configured in any manner when the following is satisfied: when the connected set 32 is determined, a first three-dimensional point 31 and a second three-dimensional point 31 present in the vicinity of each other are selected from a plurality of three-dimensional points 31 acquired using the three-dimensional measurement instrument 11; an image gradient information indicating a gradient state of a surface of the article 20 is acquired in a partial image region including points 51 on an image corresponding to the respective first three-dimensional point 31 and second three-dimensional point 31, based on image data acquired using the camera 12; it is judged whether the first three-dimensional point 31 and the second three-dimensional point 31 are present on the same article, based on three-dimensional position information of the first three-dimensional point 31 and the second three-dimensional point 31 and the acquired image gradient information; and the first three-dimensional point 31 and the second three-dimensional point 31 are included in the same connected set when it is judged that the first three-dimensional point 31 and the second three-dimensional point 31 are present on the same article.

Figure 17:
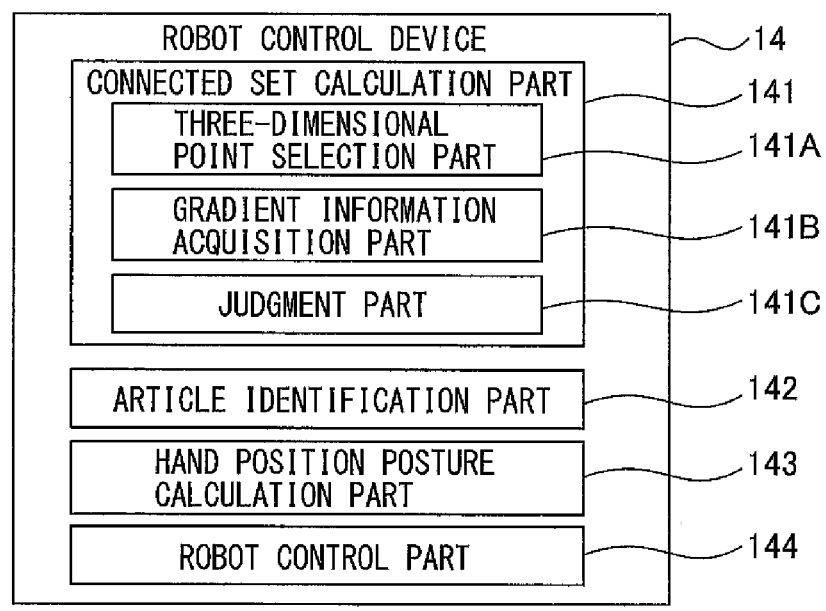
FIG. 17 is a block diagram illustrating an internal configuration of the robot control device of FIG. 1.

FIG. 17 is a block diagram illustrating an internal configuration of the robot control device 14 of FIG. 1. The robot control device 14 includes a connected set calculation part 141, an article identification part 142, a hand position posture calculation part 143, and a robot control part 144. The connected set calculation part 141 includes a three-dimensional point selection part 141A, a gradient information acquisition part 141B, and a judgment part 141C.

In the present embodiment, a vicinity three-dimensional point 310 present within a predetermined distance from the first three-dimensional point 31 is calculated as the second three-dimensional point 31 (step S30C), but the three-dimensional point selection part 141A may be configured in any manner, when the first three-dimensional point 31 and the second three-dimensional point 31 present in the vicinity of each other are selected. In the present embodiment, information of a change amount in image contrast in a partial image region is acquired as an image gradient information (step S30H), but when a gradient state of a surface of the article 20 is indicated, any the image gradient information is employable and a configuration of the gradient information acquisition part 141B is not limited to the configuration described above. In the present embodiment, by judging whether a change amount in image contrast in a partial image region is equal to or less than a predetermined value (step S30I), it is judged that the first three-dimensional point 31 and the second three-dimensional point 31 are present on the same article, but a configuration of the judgment part 141C is not limited to the configuration described above, when it is judged whether the first three-dimensional point 31 and the second three-dimensional point 31 are present on the same article based on three-dimensional position information of the first three-dimensional point 31 and the second three-dimensional point 31 and image gradient information acquired using the gradient information acquisition part 141B. In other words, the connected set calculation part 141 may be configured in any manner, when a connected set 32 made by connecting three-dimensional points 31 present in the vicinity of each other is determined from a plurality of three-dimensional points 31 acquired using the three-dimensional measurement instrument 11 based on three-dimensional position information of three-dimensional points acquired using the three-dimensional measurement instrument 11 and image data acquired using the camera 12.

In the present embodiment, the representative position posture 33 representing a connected set 32 is calculated based on position information of three-dimensional points 31 belonging to the connected set 32 (step S3), but when a position and a posture of the article 20 expressed by the connected set 32 are identified, a configuration of the article identification part 142 is not limited to the configuration described above. A position and a posture representing the connected set 32 also correspond to a position and a posture representing the article 20, and identification of a position and a posture of the article 20 refers to identification of a placement of the article 20 by determining a position and a posture representing articles. In the present embodiment, the hand position posture 34 is calculated from the representative position posture 33 (step S4), but when a hand position posture 34 capable of picking up an article 20 identified as the representative position posture 33 is determined, a configuration of the hand position posture calculation part 143 is not limited to the configuration described above. When the robot 13 is controlled so as to pick up the article 20 by moving the hand 14 to the hand position posture 34, the robot control part 144 may be configured in any manner.

It is possible to optionally combine the present embodiment with one modified example or a plurality of modified examples.

According to the present invention, when a position and a posture of an article disposed in a three-dimensional space are recognized, an image gradient information is acquired based on image data acquired using a camera; a connected set of a plurality of three-dimensional points is determined using three-dimensional position information of three-dimensional points measured using a three-dimensional measurement instrument and image gradient information; and a position and a posture of an article is identified using the connected set. Therefore, a position and a posture of an article can be easily recognized without preparing a model pattern for the article and performing a teaching operation for a user.

The present invention has been described in association with the preferred embodiment, but it should be understood by those skilled in the art that various corrections and modifications may be made without departing from the disclosed scope of the claims to be described later.

The invention claimed is:

1. An article pickup device, comprising:
a robot including a hand capable of holding an article;
a three-dimensional measurement instrument measuring surface positions of a plurality of articles disposed in a three-dimensional space to acquire a position information of a plurality of three-dimensional points;
a camera imaging an area including the plurality of articles to acquire image data;
a connected set calculation part determining a connected set made by connecting three-dimensional points present in the vicinity of each other among the plurality of three-dimensional points, based on the position information of the plurality of three-dimensional points acquired by the three-dimensional measurement instrument and the image data acquired by the camera;
an article identification part identifying a position and posture of the article, based on the position information of the three-dimensional points belonging to the connected set;
a hand position posture calculation part determining a hand position posture as a position and posture of the hand capable of picking up the article identified by the article identification part; and
a robot control part controlling the robot so as to move the hand to the hand position posture determined by the hand position posture calculation part to pick up the article, wherein the connected set calculation part comprises:
a three-dimensional point selection part selecting a first three-dimensional point and a second three-dimensional point present in the vicinity of each other among the plurality of three-dimensional points acquired by the three-dimensional measurement instrument;
a gradient information acquisition part acquiring an image gradient information indicating a gradient state of a surface of the article in a partial image region including points on an image corresponding to respective the first three-dimensional point and the second three-dimensional point, based on the image data acquired by the camera; and
a judgment part judging whether the first three-dimensional point and the second three-dimensional point are present on the same article, based on a position information of the first three-dimensional point, a position information of the second three-dimensional point, and the image gradient information acquired by the gradient information acquisition part, and
wherein the connected set calculation part prepares a list including one three-dimensional point, sets the one three-dimensional point as a reference three-dimensional point, selects one or more three-dimensional points in the vicinity of the reference three-dimensional point by the three-dimensional point selection part, judges whether selected three-dimensional points and the reference three-dimensional point are present on the same article by the judgment part, and performs a control in which the three-dimensional point which is present on the same article is included in the list,
the connected set calculation part sets a three-dimensional point, which is not selected as the reference three-dimensional point among the three-dimensional points included in the list, as the reference three-dimensional point, selects one or more three-dimensional points in the vicinity of the reference three-dimensional point by the three-dimensional point selection part, judges whether selected three-dimensional points and the reference three-dimensional point are present on the same article by the judgment part, and performs a control in which the three-dimensional point which is present on the same article is added in the list, and
the connected set calculation part repeats the control in which the three-dimensional point is added until all three-dimensional points included in the list are set as the reference three-dimensional point, determines all three-dimensional points included in the final list as the connected set.

2. The article pickup device according to claim 1, wherein the gradient information acquisition part acquires points in the image corresponding to the first three-dimensional point and the second three-dimensional point respectively, as a first two-dimensional point and a second two-dimensional point specifying the partial image region, and
the judgment part judges that the first three-dimensional point and the second three-dimensional point are present on the same article, when a distance between the first three-dimensional point and the second three-dimensional point is equal to or less than a predetermined value and a change amount of contrast of the image in the partial image region is equal to or less than a predetermined value.

3. The article pickup device according to claim 2, wherein the gradient information acquisition part acquires the first two-dimensional point and the second two-dimensional point based on calibration data of the camera.

4. The article pickup device according to claim 1, wherein the article identification part determines a representative position posture as a position and posture representing the connected set, based on the position information of the three-dimensional points belonging to the connected set, and
the hand position posture calculation part determines the hand position posture corresponding to the representative position posture.

5. The article pickup device according to claim 4, wherein the article identification part determines the representative position posture by combining a gravity center position of all the three-dimensional points belonging to the connected set and a predetermined posture in the gravity center position.

6. The article pickup device according to claim 4, wherein the article identification part obtains the representative position posture by combining a center position of a circumscribed rectangle including all the three-dimensional points belonging to the connected set and a predetermined posture.

7. The article pickup device according to claim 1, wherein the three-dimensional measurement instrument includes the camera.

8. An article pickup method for picking up an article disposed in a three-dimensional space, using a robot including a hand capable of holding the article, the method comprising:
measuring, by a three-dimensional measurement instrument, surface positions of a plurality of articles disposed in the three-dimensional space to acquire position information of a plurality of three-dimensional points;
imaging, by a camera, an area including the plurality of articles to acquire image data;
determining a connected set made by connecting the three-dimensional points present in the vicinity of each other among the plurality of three-dimensional points, based on the position information of the plurality of three-dimensional points acquired by the three-dimensional measurement instrument and the image data acquired by the camera;
identifying a position and posture of the article, based on the position information of the three-dimensional points belonging to the connected set;
determining a hand position posture as a position and posture of the hand capable of picking up the article, the position and posture of which are identified; and
controlling the robot so as to move the hand to the hand position posture to pick up the article,
wherein the determining the connected set includes:
selecting a first three-dimensional point and a second three-dimensional point present in the vicinity of each other among the plurality of three-dimensional points acquired by the three-dimensional measurement instrument;
acquiring image gradient information indicating a gradient state of a surface of the article in a partial image region including points on an image corresponding to respective first three-dimensional point and second three-dimensional point, based on the image data acquired by the camera; and judging whether the first three-dimensional point and the second three-dimensional point are present on the same article, based on a position information of the first three-dimensional point, a position information of the second three-dimensional point, and the image gradient information;

wherein the determining the connected set includes:

preparing a list including one three-dimensional point, setting the one three-dimensional point as a reference three-dimensional point, selecting one or more three-dimensional points in the vicinity of the reference three-dimensional point, judging whether selected three-dimensional points and the reference three-dimensional point are present on the same article, and performing a control in which the three-dimensional point which is present on the same article is included in the list;

setting a three-dimensional point, which is not selected as the reference three-dimensional point among the three-dimensional points included in the list, as the reference three-dimensional point, selecting one or more three-dimensional points in the vicinity of the reference three-dimensional point, judging whether selected three-dimensional points and the reference three-dimensional point are present on the same article, and performing a control in which the three-dimensional point which is present on the same article is added in the list; and repeating the control in which the three-dimensional point is added until all three-dimensional points included in the list are set as the reference three-dimensional point, and determining all three-dimensional points included in the final list as the connected set.

* * * * *